UNITED STATES PATENT OFFICE 2,127,478

ORANGE DISAZO DYES

Moses L. Crossley, Plainfield, and Lincoln M. Shafer, Highland Park, N. J., assignors to The Calco Chemical Co., Inc., Bound Brook, N. J., a corporation of Delaware No Drawing. Application March 23, 1937, Serial No. 132,516

4 Claims. (Cl. 260—183)

This invention relates to new azo dyes and particularly to new azo dyes suitable for dyeing wool and silk colors showing an excellent fastness to milling.

The azo dyes of the present invention are obtained by coupling tetrazotized benzidine disulfonic acids and their alkyl and alkoxy derivatives, with octyl phenols as the first component and naphthols such as alpha and betanaphthol, naphthoic acids and naphthol sulfonic and sulfonic acids as a second. The benzidine compound is usually tetrazotized in the usual manner and coupled in alkaline solution first with the octyl phenol and then with the naphthol. The resulting dyes produce various shades of orange on fibers. The dyes obtained from the disulfonic acid dye wool and silk colors that are fast to milling, light, washing, fulling, acids and alkalis. They discharge white when dyed on silk weighted with tin.

The invention will be described in detail in connection with the following specific examples which are representative illustrations but do not limit the invention. The parts are by weight.

Example 1

17.2 parts of benzidine 3,3' disulfonic acid are mixed with 250 parts of water and 20 parts of a 20% solution, by weight, of sodium hydroxide. The mixture is stirred and cooled by the addition of ice to between 10° C. and 15° C. 45 parts of a 16% hydrochloric acid solution is added. The mixture is then treated with sodium nitrite until a positive test is secured, indicating that diazotization is complete. The excess of mineral acid is neutralized with sodium bicarbonate. A solution containing 10.3 parts of para octyl phenol, 200 parts of water, and 10.5 parts of a 20%, by weight, solution of sodium hydroxide is added and the mixture stirred for about ½ hour, or until the octyl phenol is coupled, then a solution containing 7.8 parts of alpa naphthol, 30 parts of water and 10 parts of a 20%, by weight, solution of sodium hydroxide is prepared. This is diluted with water to about 150 parts. 10 parts of soda ash is then added to this solution and it is then added to the diazo solution. The mixture is stirred for 12 to 16 hours and the dye salted out, after the solution has been acidified with acetic acid, with sodium chloride.

The product is an orange powder which dyes both vegetable and animal fibers level tones of orange color. It has the following structural formula:

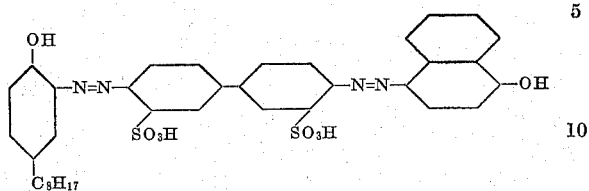

Example 2

17.2 parts of benzidine 3,3' disulfonic acid are mixed with 250 parts of water and 20 parts of a 20% solution, by weight, of sodium hydroxide. The mixture is stirred and cooled by the addition of ice to between 10° C. and 15° C. 45 parts of a 16% hydrochloric acid solution is added. The mixture is then treated with sodium nitrite until a positive test is secured, indicating that diazotization is complete. The excess of mineral acid is neutralized with sodium bicarbonate. A solution containing 10.3 parts of para octyl phenol, 200 parts of water, and 10.5 parts of a 20%, by weight, solution of sodium hydroxide is added and the mixture stirred for about ½ hour, or until the octyl phenol is coupled, then a solution containing 13.2 parts of Naphthol AS (the anilide of beta oxynaphthoic acid), 30 parts of water and 10 parts of a 20%, by weight, solution of sodium hydroxide is prepared. This is diluted with water to about 150 parts. 10 parts of soda ash is then added to this solution and it is then added to the diazo solution. The mixture is stirred for 12 to 16 hours and the dye salted out, after the solution has been acidified with acetic acid, with sodium chloride.

The product is an orange-red powder which dyes both animal and vegetable fibers level tones of orange-red or good fastness properties. It has the following structural formula:

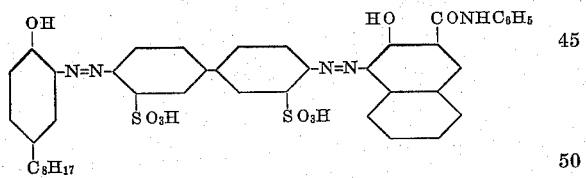

This application is in part a continuation of our earlier application, which was co-pending herewith, Serial No. 36,122, filed August 14, 1935 and which has since matured into Patent 2,075,022, issued March 30, 1937.

We claim:

1. Orange to red or red-violet disazo dyes having the following formula—

$$R_3-N=N-R_1-R_2-N=N-ROH$$

in which R is a naphthalene nucleus, $R_1-R_2$ is a benzidine disulfonic acid and $R_3$ is an octylphenol.

2. Orange to red or red-violet disazo dyes having the following formula—

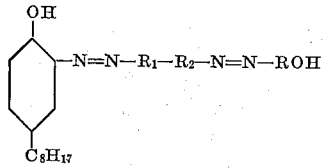

in which R is a naphthalene nucleus, and $R_1-R_2$ is a benzidine disulfonic acid.

3. Orange to red or red-violet disazo dyes having the following formula—

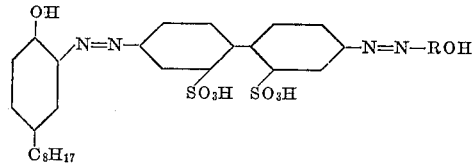

in which R is a naphthalene nucleus.

4. Orange to red or red-violet disazo dyes having the following formula—

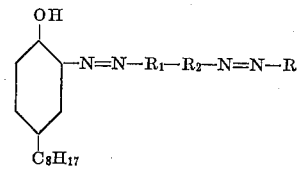

where R is an anilide of an oxynaphthoic acid and $R_1-R_2$ is a benzidine disulfonic acid.

MOSES L. CROSSLEY.
LINCOLN M. SHAFER.